US011378421B2

(12) United States Patent
Santos et al.

(10) Patent No.: US 11,378,421 B2
(45) Date of Patent: Jul. 5, 2022

(54) ABSOLUTE POSITION SENSOR USING HALL ARRAY

(71) Applicant: The Timken Company, North Canton, OH (US)

(72) Inventors: Alfred John Santos, Keene, NH (US); Mark E. LaCroix, Winchester, NH (US); Lei Wang, Solon, OH (US)

(73) Assignee: The Timken Company, North Canton, OH (US)

( * ) Notice: Subject to any disclaimer, the term of this patent is extended or adjusted under 35 U.S.C. 154(b) by 75 days.

(21) Appl. No.: 17/101,260

(22) Filed: Nov. 23, 2020

(65) Prior Publication Data

US 2021/0072049 A1 Mar. 11, 2021

Related U.S. Application Data

(63) Continuation of application No. 16/463,230, filed as application No. PCT/US2017/064482 on Dec. 4, 2017, now Pat. No. 10,876,863.

(60) Provisional application No. 62/438,704, filed on Dec. 23, 2016.

(51) Int. Cl.
*G01D 5/245* (2006.01)

(52) U.S. Cl.
CPC ......... *G01D 5/2458* (2013.01); *G01D 5/2454* (2013.01)

(58) Field of Classification Search
CPC ............................. G01D 5/2458; G01D 5/2454
See application file for complete search history.

(56) References Cited

U.S. PATENT DOCUMENTS

| 4,479,078 A | 10/1984 | Kidd et al. |
| 4,953,842 A | 9/1990 | Tolmie, Jr. et al. |
| 5,029,304 A | 7/1991 | Tolmie, Jr. |
| 5,068,529 A | 11/1991 | Ohno et al. |

(Continued)

FOREIGN PATENT DOCUMENTS

| DE | 4136888 A1 | 5/1993 |
| EP | 2189761 A1 | 5/2010 |

OTHER PUBLICATIONS

International Search Report and Written Opinion of PCT/US2017/064482, dated Jun. 4, 2018 (20 pages).

(Continued)

*Primary Examiner* — Reena Aurora
(74) *Attorney, Agent, or Firm* — Michael Best & Friedrich LLP

(57) ABSTRACT

A system for determining an absolute position of a device includes a high resolution track, a sensor and processing unit associated with the high resolution track, a reference track having a plurality of pole pairs arranged to define a plurality of single-track Gray code segments, and an array of Hall effect sensors associated with the reference track to output a reference signal to the sensor and processing unit indicative of the coarse absolute position of the device over the Gray code segments. A third track has at least one pole pair. At least one sensor associated with the third track outputs a signal used to determine a location within one of the plurality of Gray code segments. The sensor and processing unit combines the third track signal, the reference signal, and the position of the device over the high resolution track to determine an initial, fine absolute position.

20 Claims, 7 Drawing Sheets

(56) References Cited

U.S. PATENT DOCUMENTS

| | | | |
|---|---|---|---|
| 5,307,013 | A | 4/1994 | Santos et al. |
| 5,519,393 | A | 5/1996 | Brandestini |
| 5,574,445 | A | 11/1996 | Maresca et al. |
| 6,515,471 | B1 | 2/2003 | Santos et al. |
| 6,841,958 | B2 | 1/2005 | Desbiolles et al. |
| 7,022,975 | B2 * | 4/2006 | Horton ................. G01D 5/2455 318/727 |
| 7,112,781 | B2 | 9/2006 | Ch'ng et al. |
| 7,649,332 | B2 | 1/2010 | Lundell |
| 7,999,536 | B2 | 8/2011 | Santos et al. |
| 8,823,365 | B2 | 9/2014 | Santos et al. |
| 9,923,433 | B2 * | 3/2018 | Sangermano, II ....... G01D 5/00 |
| 2011/0083553 | A1 | 4/2011 | Duerr et al. |
| 2017/0047823 | A1 | 2/2017 | Sangermano, III et al. |
| 2019/0195660 | A1 * | 6/2019 | Villaret .............. G01D 5/24476 |

OTHER PUBLICATIONS

Northwestern.edu, Neuroscience and Robotics Lab, "Rotary Encoder," Jul. 7, 2017, http://hades.mech.northwestern.edu/index.php/Rotary_Encoder (5 pages).

Dr. Markus Erlich, "Reinventing Absolute Rotary Encoders," Control Engineering, May 15, 2015, http://www.controleng.com/single-article/reinventing-absolute-rotary-encoders/d6a7ce04357e099483f46192ba6badcb.html (3 pages).

Bogen Electric, "Magnetic Measurement Solutions," Jul. 7, 2017, http://www.bogen-electronic.com/en/magnetic-measurement-solutions/technology/absolute-and-incremental-measurement.html (4 pages).

* cited by examiner

ABSOLUTE POSITION SENSOR USING HALL ARRAY

RELATED APPLICATIONS

This application is a continuation of U.S. patent application Ser. No. 16/463,230 filed May 22, 2019, which is a national phase application of PCT Application No. PCT/US2017/064482 filed Dec. 4, 2017, which claims the benefit of U.S. Provisional Patent Application No. 62/438,704 filed on Dec. 23, 2016, the entire content of each of which is hereby incorporated herein by reference.

BACKGROUND

The present invention relates to position sensing systems and methods.

Various absolute position sensors and associated signal processing techniques are known for determining an absolute position of a rotating or linearly-moving target. For example, U.S. Pat. No. 8,058,868 discloses one such example of an off axis magnetic sensor that uses a two-track, multi-pole magnetic target with evenly-spaced and sized high resolution magnetic poles. The entire specification of U.S. Pat. No. 8,058,868 is hereby incorporated by reference herein. The '868 patent describes how to use a high resolution Hall effect sensor like the Timken MPS160 or MPS512 sensor chip to detect local absolute position over a magnetic pole pair. The '868 patent shows how to use a second track with one or more pole pairs to generate a coarse or low resolution absolute position signal that can then be used together with a high resolution Hall effect sensor like the Timken MPS160 or MPS512 sensor chip to determine a fine or high resolution absolute position over a longer arc or longer linear range.

Also known is the use of Gray code encoding on magnetic encoders. Gray code encoding is a system of binary counting in which any two adjacent codes differ by only one bit position. It is possible to arrange several sensors adjacent a single track (ring or linear) so that consecutive positions differ at only a single sensor. The result is the single-track Gray code encoder. This concept can be used for the reference track of the encoder described in the '868 patent such that the signal from the reference-track Gray code can be combined with the signal from the high resolution Hall effect sensor, processed using software on the processor, and then outputted as a fine or high resolution absolute position signal.

SUMMARY

The present invention contemplates improvements to the sensor arrangements and signal processing described above. In one embodiment, the latency or processing time conventionally required to repeatedly or continuously calculate the fine or high resolution absolute position with conventional software and processors can be greatly reduced. Conventionally, the processing chip, which can be internal or external to the high resolution sensor or incorporated into the high resolution sensor, must repeatedly combine and process the output signal from the reference track with the output signal from the high resolution track to determine the fine absolute position. According to one embodiment of the present invention, after the initial fine absolute position calculation is completed one time by the processing chip, the system then uses an up/down count signal to continuously, or on demand, update the full absolute position reading without any further software processing. The absolute position is maintained in an up/down hardware counter. Such a hardware counter can increment or decrement independently of any software. This results in a fine or high resolution absolute position output signal that is achieved more quickly and efficiently than conventional software-generated signals, as it is delayed only by the logic timing associated with the up/down counter for each change in position, and not by any processing times associated with the software or processor.

In another embodiment, the resolution of encoders utilizing a single-track Gray code arrangement can be improved via modification. A third track is added to further subdivide the number of positions that can be determined by the single-track Gray code arrangement of the reference track. When combined with the signal from the high-resolution track and the reference track, the encoder can achieve an increased resolution.

In another embodiment, the resolution of encoders utilizing a single-track Gray code arrangement can be improved via a different modification. The inventive reference track is configured with a modified single-track Gray code that defines 2 or more distinct segments of the reference track (ring or linear), each segment having its own Gray code (which can all be the same Gray code or different Gray codes). A third track is then added and can be used to identify each distinct Gray code segment to construct higher resolution absolute position detection over one revolution or length of the encoder. The use of multiple Gray code segments on the reference track also enables a reduction in the physical space needed for the Hall array associated with the reference track, and can also help to reduce the overall system cost.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

As should also be apparent to one of ordinary skill in the art, the systems shown in the figures are models of what actual systems might be like. As noted, many of the modules and logical structures described are capable of being implemented in software executed by a microprocessor or a similar device or of being implemented in hardware using a variety of components including, for example, application specific integrated circuits ("ASICs"). Terms like "processing unit" may include or refer to both hardware and/or software. Furthermore, throughout the specification capitalized terms are used. Such terms are used to conform to common practices and to help correlate the description with the coding examples and drawings. However, no specific meaning is implied or should be inferred simply due to the use of capitalization. Thus, the claims should not be limited to the specific examples or terminology or to any specific hardware or software implementation or combination of software or hardware.

Figure 1:
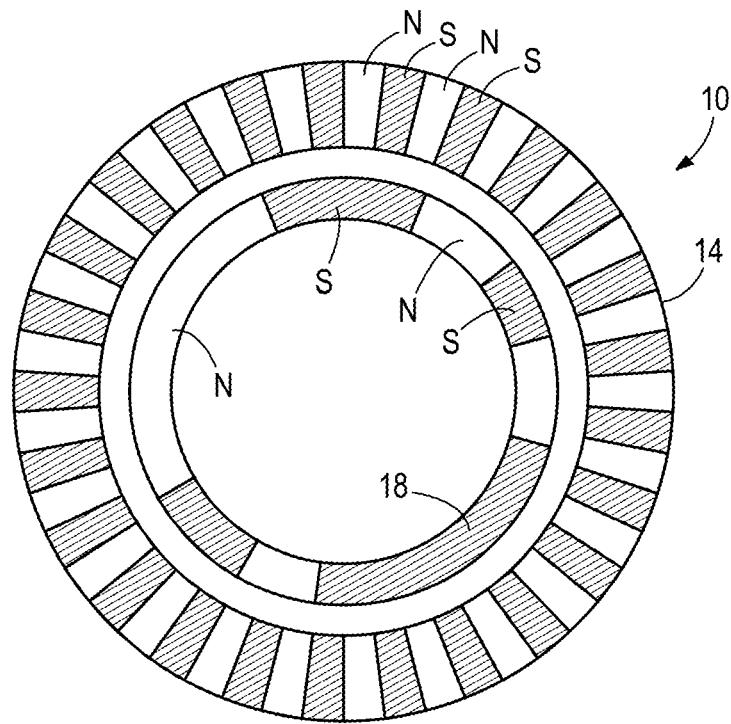
FIGS. 1-4 show a first absolute position sensing system embodying the invention.
Figure 2:
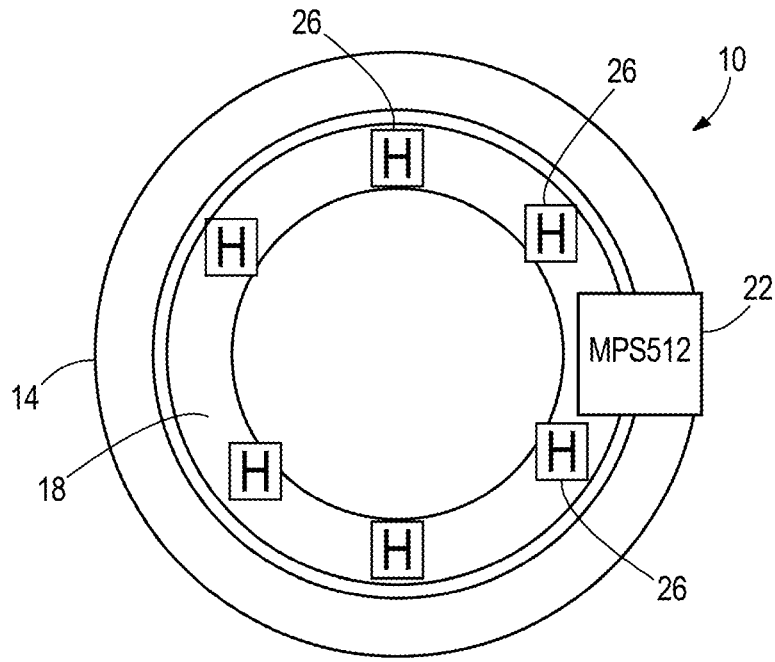
Figure 3:
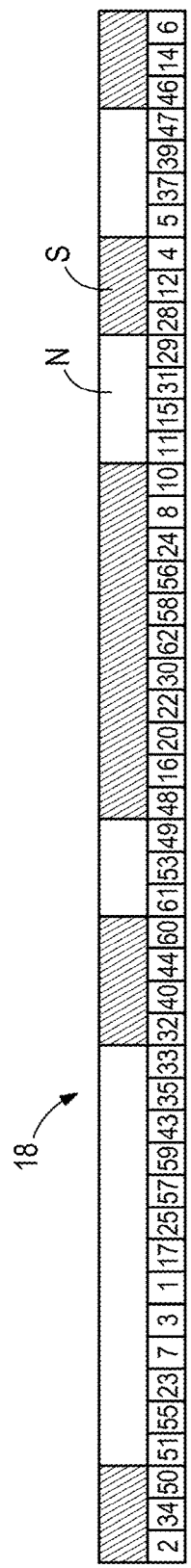

FIGS. 1-4 illustrate a first absolute position sensing system 10. With reference to FIG. 1, the first sensing system 10 includes a first multi-polar magnetic ring or high resolution track 14, which includes twenty-five magnetic pole pairs or North/South pole pairs. Each pole of each North/South pole pair is the same size (e.g., arc length). A second multi-polar magnetic ring or a reference track 18 is positioned concentrically within the high resolution track 14. In the embodiment shown, the reference track 18 includes four magnetic pole pairs or North/South pole pairs. The illustrated pole pairs of the reference track 18 are arranged to define what is known as a single-track Gray code. Gray encoding is a system of binary counting in which any two adjacent codes differ by only one bit position. It is possible to arrange several sensors adjacent to a single track (ring or linear) so that consecutive positions differ at only a single sensor, thereby allowing the sensor array to determine an absolute position about the single-track Gray code segment. As shown in FIG. 1, the single-track Gray code configuration is a single segment that extends over the entire arc length of the circular reference track 18. FIG. 3 illustrates the Gray code segment of the reference track 18 stretched linearly, and illustrates how an array of 6 Hall effect sensors can determine a coarse position among 48 possible positions along the single-track Gray code segment. As will be explained below, other embodiments can include a reference track having two or more single-track Gray code segments that together extend over the 360 degree arc length of the reference track.

It should be noted that the high resolution track 14 can have more or fewer magnetic pole pairs in other embodiments. Similarly, the reference track 18 can have more or fewer magnetic pole pairs in other embodiments. Additionally, the orientation of the reference track 18 being within the high resolution track 14 could be reversed, such that the reference track 18 is outside the high resolution track 14. Furthermore, while shown as circular tracks, those skilled in the art will understand that parallel linear tracks could be used instead of concentric or radial circular tracks.

FIG. 2 illustrates the sensors associated with the high resolution track 14 and the reference track 18 of FIG. 1. The tracks 14, 18 are shown schematically in FIG. 2 without the pole pairs illustrated. A sensor and processing unit 22 is associated with the high resolution track 14 and is configured to determine a position of the device over one of the North/South pole pairs of the high resolution track 14. The processing unit 22 takes the form of a sensing ASIC, such as a Timken MPS160 or MPS512 chip, and is capable of determining the absolute position of a target magnet within one North/South pole pair of the high resolution track 14 only. The processing unit 22 can also generate a reference pulse signal that indicates a center position of the one North/South pole pair. The processing unit 22 includes an internal sensor array 24 (see FIGS. 7-9) to generate an output that is indicative of an angular position of a pole pair under the processing unit 22. It should be appreciated that the internal sensor array 24 can include a string of sensing elements such as Hall effect sensors. It should be understood that the processing unit 22 can include an optional interface for interfacing with components external to the processing unit 22.

An array of Hall effect sensors 26 is associated with the reference track 18 and is configured to determine a coarse absolute position of the device over the single-track Gray code segment and to output a reference signal to the processing unit 22 indicative of the coarse absolute position of the device over the single-track Gray code segment of the reference track 18. While six Hall effect sensors are shown in the array 26, other embodiments can use different numbers of sensors. The distance between adjacent sensors 26 can be equal, but can be longer than a pole length of one or more poles on the reference track 18. With the coarse absolute position determined by the reference track 18, the processing unit 22 combines the reference signal with the position of the device over one of the North/South pole pairs of the high resolution track 14 to determine an initial, fine absolute position of the device. For a rotary encoder, this can be an absolute mechanical angle/angular position of a target/target wheel.

Figure 4:
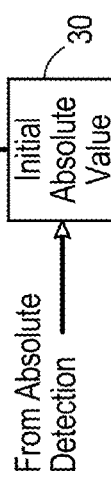

After the initial fine absolute position calculation is completed one time by the sensor and processing unit 22, the system 10 then uses an up/down count signal to continuously, or on demand, update the fine absolute position reading without any further software processing. FIG. 4 schematically illustrates this usage of an up/down data counter. As shown in FIG. 4, the initial fine absolute position of the device is represented in box 30. In some embodiments, the initial absolute value represented in box 30 could be the summation of the detected initial absolute value plus an offset value specific to a customer application. In this manner, the start position (e.g., 0 position) of the absolute encoder can be set for a specific customer application. This offset capability can alternatively be achieved in the manner discussed below with respect to FIG. 10. This initial absolute value 30 is loaded into an up/down counter 34 (which can be a Quadrature Counter or a Quadrature decoder with an up/down counter). The up/down counter 34 is incremented or decremented independently of any software using the A and B high-resolution quadrature signals 38 associated with the high resolution track 14. The output from the up/down counter 34 can be of any typical architecture or format for parallel or serial output, such as SPI. The output from the up/down counter 34 provides absolute results indicative of the fine absolute position, without any further software-based processing, to maintain and continuously update the fine absolute position of the device. This results in a fine or high resolution absolute position output signal that is achieved more quickly and efficiently than conventional software-generated signals, as it is delayed only by the logic timing associated with the up/down counter 34 for each change in position, and not by any processing times associated with software or a processor.

Figure 5:
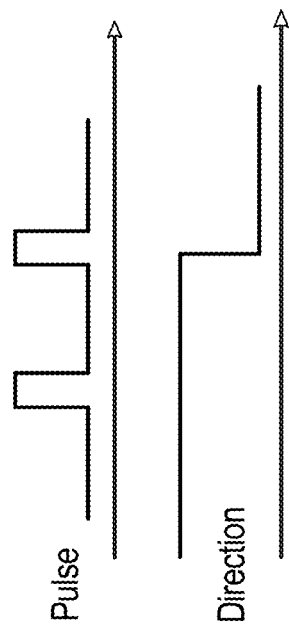
FIG. 5 illustrates alternative signal-types that can be used.

As an alternative to using the A and B high-resolution quadrature signals 38 to increment/decrement the counter 34, the input to the counter 34 could be pulse and direction signals from the high resolution track 14, as shown in FIG. 5.

In one application, a signal generated by the up/down counter 34 is further processed (e.g., by an additional logic circuit) to generate a low resolution signal or signals, such as three low resolution square wave signals with a 120 degree difference, which can be used for motor commutation detection and control. These commutation signals for motor control, based on the absolute position value from the up/down counter 34, are as accurate as a high resolution signal, more accurate than the conventional method that uses hall sensors to directly detect coarse/reference track transition edges, and provides a faster response as compared to software-generated commutation signals.

Figure 6:
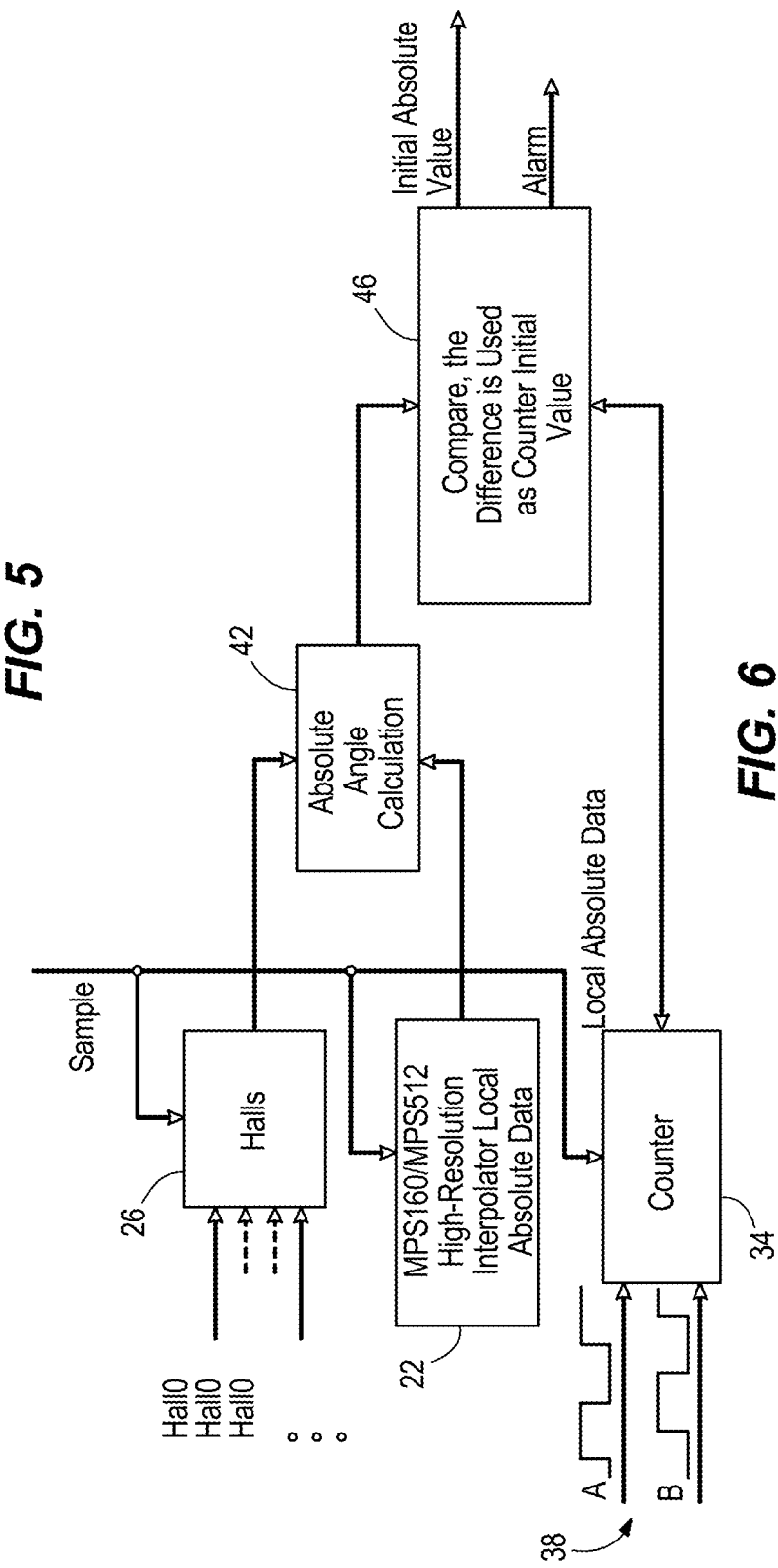
FIG. 6 illustrates a method of verifying the absolute position signal generated by the first absolute position sensing system of FIGS. 1-4.

FIG. 6 illustrates a process for verifying the data output from the up/down counter 34. More specifically, it illustrates an operation that can be repeated at a lower frequency to constantly monitor whether the counter output agrees with the fine absolute position or angle calculation. Sometimes static discharges, such as nearby lightning strikes, can negatively impact the up/down counter 34. To verify the accuracy of the counter's output, periodic checking can occur. As shown in FIG. 6, the fine absolute position can be re-calculated at block 42 in the same manner as described above for the initial, fine absolute position 30 calculation. This re-calculated value can be compared with the actual output from the counter 34 at block 46. If there is a confirmed mismatch indicating the counter 34 has a wrong value, the counter 34 will be reloaded with the new counter initial value. An alarm can also be used to notify of the mismatch/error. This process can be utilized with any of the absolute position sensing systems described herein.

Figure 7:
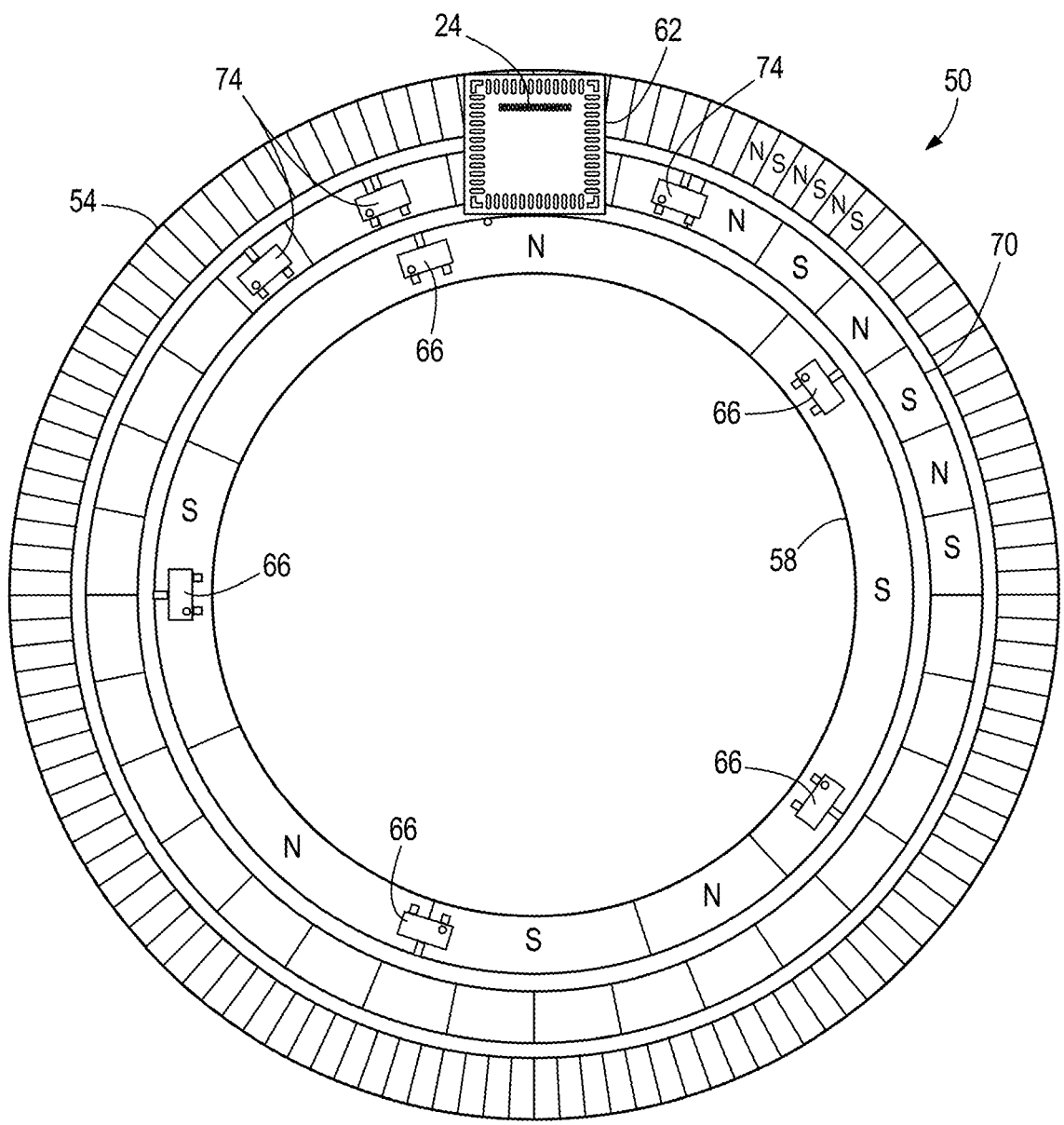
FIG. 7 shows a second absolute position sensing system embodying the invention.

FIG. 7 illustrates a second absolute position sensing system 50. The second sensing system 50 includes a first multi-polar magnetic ring or high resolution track 54, which includes sixty-four magnetic pole pairs or North/South pole pairs. Each pole of each North/South pole pair is the same size (e.g., arc length). A second multi-polar magnetic ring or a reference track 58 is positioned concentrically within the high resolution track 54. In the embodiment shown, the reference track 58 includes three magnetic pole pairs or North/South pole pairs arranged to define a single-track Gray code.

A sensor and processing unit 62 is associated with the high resolution track 54 and is configured to determine a position of the device over one of the North/South pole pairs of the high resolution track 54. The sensor and processing unit 62 takes the form of a sensing ASIC, such as a Timken MPS160 or MPS512 chip, and is capable of determining the absolute position of a target magnet within one North/South pole pair of the high resolution track 54 only. An array of Hall effect sensors 66 is associated with the reference track 58 and is configured to determine a coarse absolute position of the device over the single-track Gray code segment and to output a reference signal to the processing unit 62 indicative of the coarse absolute position of the device over the single-track Gray code segment of the reference track 58. The distance between adjacent sensors 66 can be equal, but can be longer than a pole length of one or more poles on the reference track 58. The single-track Gray code of the reference track 58, when combined with the array of five Hall effect sensors 66, can provide thirty coarse positions. However, thirty positions are not enough to provide the fine absolute position because the high resolution track includes sixty-four pole pairs.

In order to increase the resolution for the sixty-four pole pairs of the high resolution track 54, a third track or second reference track 70 is provided. As illustrated in FIG. 7, the third track 70 is located concentrically between the high resolution track 54 and the reference track 58, and includes sixteen North/South pole pairs, with each pole of each North/South pole pair being the same size (e.g., arc length). The arc length of each pole pair of the third track 70 encompasses four pole pairs of the high resolution track 54. In this manner, the thirty course positions identifiable by the reference track 58, in combination with the output from the third track sensors 74, can identify the fine absolute position over 4×16=64 pole pairs of the high resolution track 54. If using a nine bit high-resolution interpolator, the encoder output will be 0, 1, . . . , 64×2^9−1. An array of Hall effect sensors 74 (three sensors are shown) is associated with the third track 70 and communicates with the processing unit 62. This system 50 can avoid using very small (narrow/short arc length) North/South pole pairs, so as to allow using low cost sensors (such as Hall switch sensors) for the reference track 58 and the third track 70, while still achieving increased resolution as compared to the first sensing system 10. It should be noted that the respective positions of the tracks (i.e., inside or outside of one another) can be varied from the illustrated embodiment.

Figure 8:
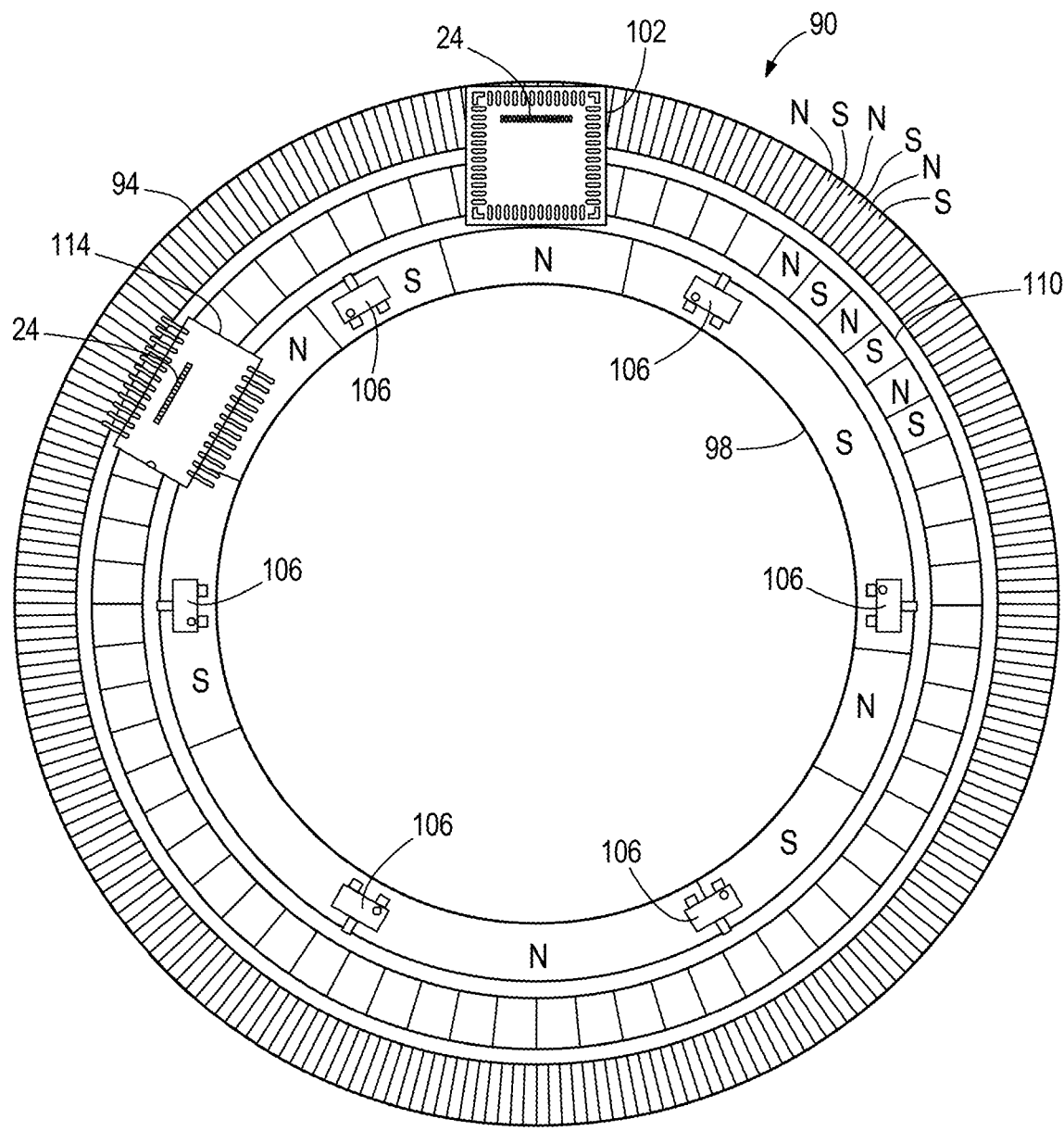
FIG. 8 shows a third absolute position sensing system embodying the invention.

FIG. 8 illustrates a third absolute position sensing system 90 that provides even higher resolution than the second system 50. The third sensing system 90 includes a first multi-polar magnetic ring or high resolution track 94, which includes one hundred twenty-eight magnetic pole pairs or North/South pole pairs. Each pole of each North/South pole pair is the same size (e.g., arc length). A second multi-polar magnetic ring or a reference track 98 is positioned concentrically within the high resolution track 94. In the embodiment shown, the reference track 98 includes four magnetic pole pairs or North/South pole pairs arranged to define a single-track Gray code.

A sensor and processing unit 102 is associated with the high resolution track 94 and is configured to determine a position of the device over one of the North/South pole pairs of the high resolution track 94. The processing unit 102 takes the form of a sensing ASIC, such as a Timken MPS160 or MPS512 chip, and is capable of determining the absolute position of a target magnet within one North/South pole pair of the high resolution track 94 only. An array of Hall effect sensors 106 is associated with the reference track 98 and is configured to determine a coarse absolute position of the device over the single-track Gray code segment and to output a reference signal to the processing unit 102 indicative of the coarse absolute position of the device over the single-track Gray code segment of the reference track 98. The distance between adjacent sensors 106 can be equal, but can be longer than a pole length of one or more poles on the reference track 98. The single-track Gray code of the reference track 98, when combined with the array of six Hall effect sensors 106, can provide forty-eight coarse positions. However, forty-eight positions are not enough to provide the fine absolute position because the high resolution track includes one hundred twenty-eight pole pairs.

In order to increase the resolution for the one hundred twenty-eight pole pairs of the high resolution track 94, a third track or second reference track 110 is provided. As illustrated in FIG. 8, the third track 110 is located concentrically between the high resolution track 94 and the reference track 98, and includes thirty-two North/South pole pairs, with each pole of each North/South pole pair being the same size (e.g., arc length). The arc length of each pole pair of the third track 110 encompasses four pole pairs of the high resolution track 94. In this manner, the forty-eight course positions identifiable by the reference track 98, in combination with the output from the third track 110, can identify the fine absolute position over 4×32=128 pole pairs of the high resolution track 94. For this higher resolution system 90, another sensing ASIC 114, such as a Timken MPS160 or MPS512 chip, is associated with the third track 110 and is used in place of an array of Hall effect sensors. The increased resolution/sensitivity of the chip 114 enables the use of more pole pairs on the third track 110 to increase the overall resolution of the encoder. Both the chip 114 and the array of Hall effect sensors 106 communicate with the processing unit 102. In other embodiments, the chip 114 associated with the third track 110 and the processing unit 102 associated with the high resolution track 94 can be integrated into a single integrated circuit chip. It should be noted that the respective positions of the tracks (i.e., inside or outside of one another) can be varied from the illustrated embodiment.

Figure 9:
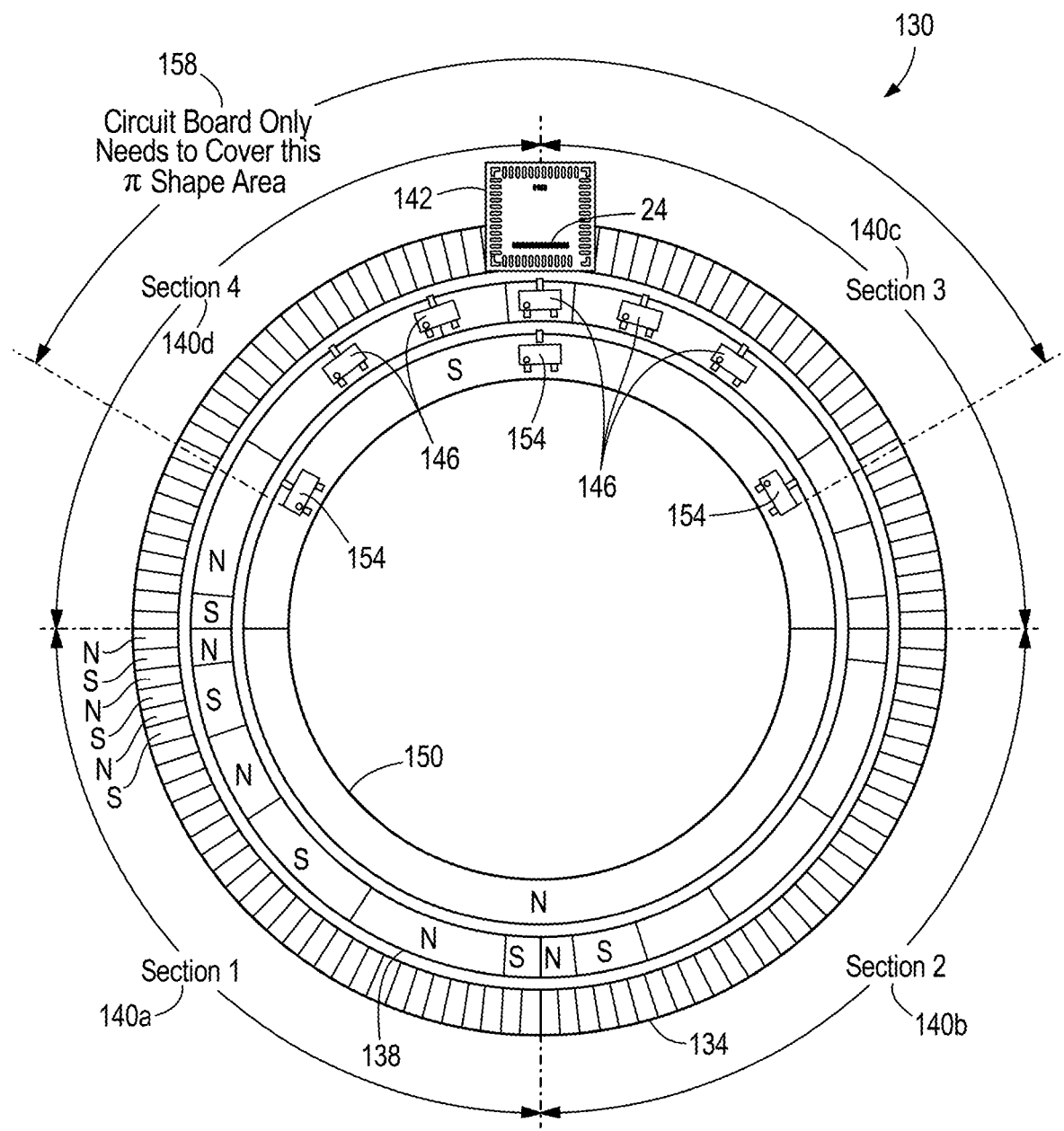
FIG. 9 shows a fourth absolute position sensing system embodying the invention.

FIG. 9 illustrates a fourth absolute position sensing system 130 that provides a resolution like the second system 50 in a different manner. The fourth sensing system 130 includes a first multi-polar magnetic ring or high resolution track 134, which includes sixty-four magnetic pole pairs or North/South pole pairs. Each pole of each North/South pole pair is the same size (e.g., arc length). A second multi-polar magnetic ring or a reference track 138 is positioned concentrically within the high resolution track 134. In the embodiment shown, the reference track 138 includes magnetic pole pairs or North/South pole pairs arranged to define a plurality of single-track Gray code segments or sections. As shown in FIG. 9, there are four single-track Gray code segments 140a, 140b, 140c, and 140d on the reference track 138. Each Gray code segment 140a, 140b, 140c, and 140d spans a ninety degree segment of the reference track 138. In other embodiments, there could be two, three, five, or more Gray code segments making up the reference track 138.

A sensor and processing unit 142 is associated with the high resolution track 134 and is configured to determine a position of the device over one of the North/South pole pairs of the high resolution track 134. The processing unit 142 takes the form of a sensing ASIC, such as a Timken MPS160 or MPS512 chip, and is capable of determining the absolute position of a target magnet within one North/South pole pair of the high resolution track 134 only. An array of Hall effect sensors 146 is associated with the reference track 138 and is configured to determine a coarse absolute position of the device over any one of the single-track Gray code segments 140a, 140b, 140c, and 140d, and to output a reference signal to the processing unit 142 indicative of the coarse absolute position of the device over the respective single-track Gray code segment 140a, 140b, 140c, and 140d of the reference track 138. Each of the single-track Gray code segments 140a, 140b, 140c, and 140d of the reference track 138, when combined with the array of five Hall effect sensors 146, can provide thirty coarse positions over each ninety degree arc length. The distance between adjacent sensors 146 can be equal, but can be longer than a pole length of one or more poles on a respective single-track Gray code segment 140a, 140b, 140c, and 140d of the reference track 138.

In order to link the coarse positions of the four Gray code segments 140a, 140b, 140c, and 140d to the high resolution track 134, a third track or second reference track 150 is provided. As illustrated in FIG. 9, the third track 150 is located concentrically inside both of the high resolution track 134 and the reference track 138, and includes a single North/South pole pair, with each pole of the single North/South pole pair being the same or slightly different size (e.g., arc length). An array of Hall effect sensors 154 (three sensors are shown) is associated with the third track 150 and communicates with the processing unit 142. The output from the third track 150 can be used to determine the position within one of the four Gray code segments 140a, 140b, 140c, and 140d. In this manner, the thirty course positions identifiable by the each Gray code segment 140a, 140b, 140c, and 140d of the reference track 138, in combination with the output from the third track 150, can identify the fine absolute position within the sixty-four pole pairs of the high resolution track 134. It should be noted that the respective positions of the tracks (i.e., inside or outside of one another) can be varied from the illustrated embodiment.

The fourth system 130 of FIG. 9 can provide the same resolution as the second system 50 however the fourth system 130 provides some advantages in terms of space and cost reduction. Specifically, as indicated by the arc length indicator 158, all of the Hall effect sensors 146 and 154, in addition to the chip of the processing unit 142 are confined within less than a one hundred and eighty degree span, and as illustrated, about a one hundred twenty-five degree span of the encoder. This means that if all of the sensors 146, 154 and the chip 142 are combined onto a single chip, the chip size can be significantly reduced in comparison to a single chip supporting all of the sensors of the second system 50. This opens up space over at least half of the encoder for additional hardware components. In fact, while not shown, in yet another embodiment, it is actually possible to achieve a further size reduction because the sensors 154 could even be moved closer together and centered on the top dead center position such that the arc length of the five sensors 146 would be the limiting factor on the size of the chip. In that embodiment, the circuit board could be confined to within about a seventy-five degree span of the encoder.

One of skill in the art will understand that with any of the disclosed embodiments having three circular tracks, the relative positions of the tracks can be selected as desired such that any of the tracks can be the outside, inside, or middle track.

Figure 10:
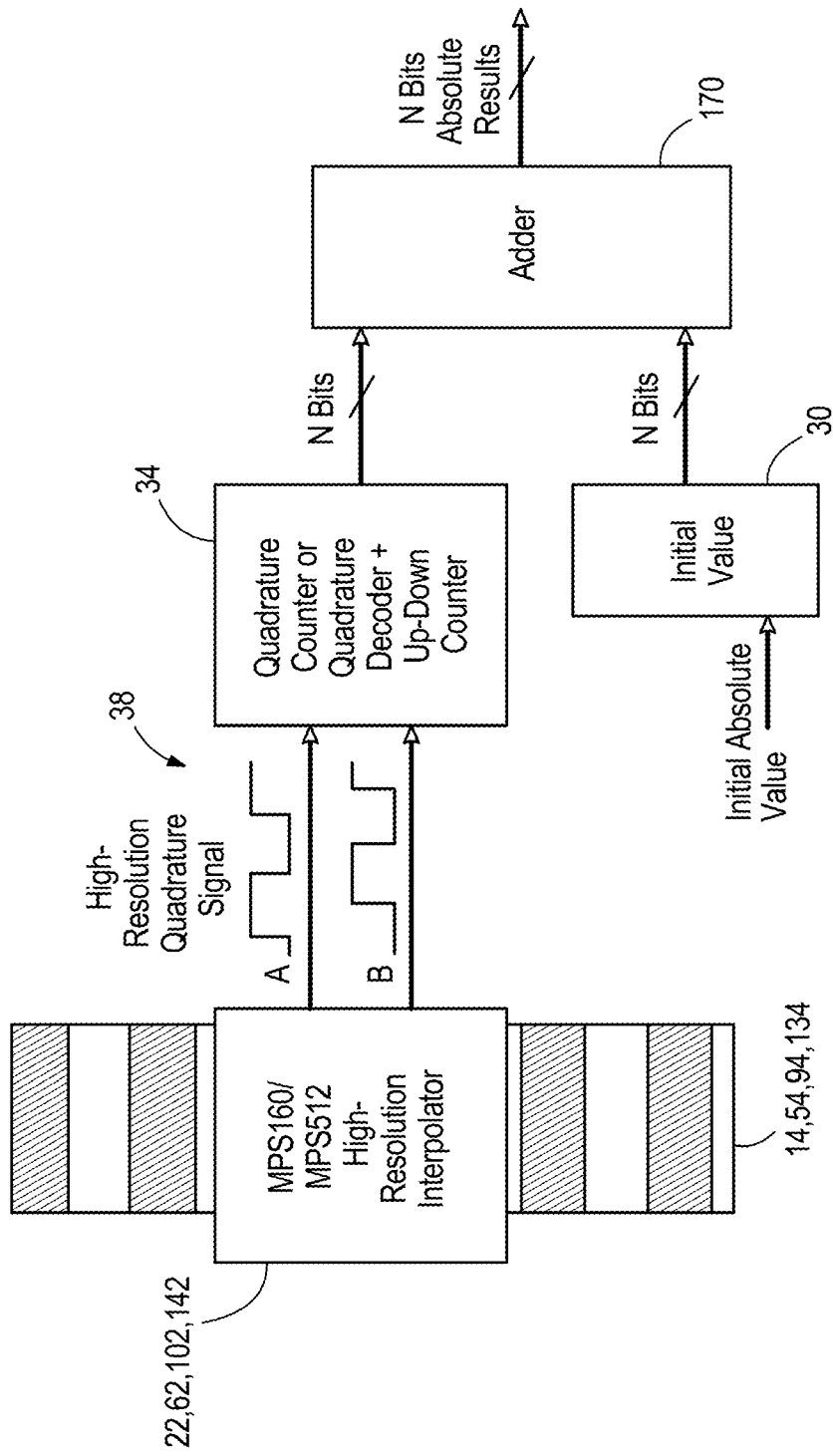
FIG. 10 illustrates an alternative signal processing flow to FIG. 4.

Just as described with the first system 10, each of the systems 50, 90, and 130 can utilize the up/down data counter 34 and signal processing flow outlined in FIG. 4. In yet other embodiments of signal processing for each of the systems 10, 50, 90, and 130, an alternative signal processing flow shown in FIG. 10 can be utilized. As shown in FIG. 10, hardware or software can be utilized to provide an adding function at block 170. This can be used in applications when an offset is desired for the encoder. In this flow, the initial value 30 and the output from the up/down counter 34 are separately input into the adder 170, which can apply the desired offset function and then output the resulting absolute position signal.

Various features and advantages of the invention are set forth in the following claims.

What is claimed is:
1. A system for determining an absolute position of a device, the system comprising:
a high resolution track having a plurality of North/South pole pairs, each pole of each North/South pole pair being a same size;

a sensor and processing unit associated with the high resolution track and configured to determine a position of the device over one of the North/South pole pairs of the high resolution track;

a reference track having a plurality of North/South pole pairs arranged to define a plurality of single-track Gray code segments;

an array of Hall effect sensors associated with the reference track and configured to determine a coarse absolute position of the device over the single-track Gray code segments and to output a reference signal to the sensor and processing unit indicative of the coarse absolute position of the device over the single-track Gray code segments;

a third track having at least one North/South pole pair; and at least one sensor associated with the third track and operable to output a third track signal used to determine a location within one of the plurality of single-track Gray code segments;

wherein the sensor and processing unit combines the third track signal, the reference signal, and the position of the device over one of the North/South pole pairs of the high resolution track to determine an initial, fine absolute position of the device.

2. The system of claim 1, wherein the third track is positioned concentrically inside both of the high resolution track and the reference track.

3. The system of claim 1, wherein the third track has only a single North/South pole pair.

4. The system of claim 1, wherein the high resolution track, the reference track, and the third track are circular tracks arranged concentrically, and wherein the array of Hall effect sensors associated with the reference track, the at least one sensor associated with the third track, and the sensor and processing unit are all confined within less than a one hundred and eighty degree span of the circular tracks.

5. The system of claim 4, wherein the high resolution track, the reference track, and the third track are circular tracks arranged concentrically, and wherein the array of Hall effect sensors associated with the reference track, the at least one sensor associated with the third track, and the sensor and processing unit are all confined within about a one hundred and twenty-five degree span of the circular tracks.

6. The system of claim 1, wherein the array of Hall effect sensors includes 5-8 Hall effect sensors.

7. The system of claim 1, wherein the high resolution track, the reference track, and the third track are circular tracks arranged concentrically.

8. The system of claim 1, wherein the high resolution track, the reference track, and the third track are linear tracks arranged in parallel.

9. The system of claim 1, further comprising an up/down hardware counter operable to increment the initial fine absolute position determined by the sensor and processing unit using a signal generated from the high resolution track, and without any further software-based processing, to maintain and continuously update the fine absolute position of the device.

10. The system of claim 9, wherein the signal generated from the high resolution track and used to update the fine absolute position of the device is one of a high resolution quadrature signal, a pulse signal, or a direction signal provided to the up/down counter.

11. The system of claim 9, further comprising an adder operable to receive the initial, fine absolute position of the device and a signal from the up/down counter and to apply an offset to the absolute position of the device.

12. The system of claim 9, wherein a signal generated by the up/down counter is further processed to generate a low resolution signal including three low resolution square wave signals with a 120 degree difference for use in motor commutation detection and control.

13. The system of claim 1, wherein the at least one sensor associated with the third track is an array of Hall effect sensors mounted on an ASIC chip.

14. The system of claim 1, wherein the plurality of North/South pole pairs arranged on the reference track define four single-track Gray code segments.

15. The system of claim 1, wherein the sensor and processing unit associated with the high resolution track, the array of Hall effect sensors associated with the reference track, and the at least one sensor associated with the third track are all mounted on a single ASIC chip.

16. A system for determining an absolute position of a device, the system comprising:

a high resolution track having a plurality of North/South pole pairs, each pole of each North/South pole pair being a same size;

a sensor and processing unit associated with the high resolution track and configured to determine a position of the device over one of the North/South pole pairs of the high resolution track;

a reference track having a plurality of North/South pole pairs arranged to define a plurality of single-track Gray code segments;

an array of Hall effect sensors associated with the reference track and configured to determine a coarse absolute position of the device over the single-track Gray code segments and to output a reference signal to the sensor and processing unit indicative of the coarse absolute position of the device over the single-track Gray code segments;

a third track having at least one North/South pole pair; and at least one sensor associated with the third track and operable to output a third track signal used to determine a location within one of the plurality of single-track Gray code segments;

wherein the sensor and processing unit combines the third track signal, the reference signal, and the position of the device over one of the North/South pole pairs of the high resolution track to determine an initial, fine absolute position of the device; and an up/down hardware counter operable to increment the initial fine absolute position determined by the sensor and processing unit using a signal generated from the high resolution track, and without any further software-based processing, to maintain and continuously update the fine absolute position of the device.

17. The system of claim 16, wherein the high resolution track, the reference track, and the third track are circular tracks arranged concentrically, and wherein the array of Hall effect sensors associated with the reference track, the at least one sensor associated with the third track, and the sensor and processing unit are all confined within less than a one hundred and eighty degree span of the circular tracks.

18. The system of claim 16, further comprising an adder operable to receive the initial, fine absolute position of the device and a signal from the up/down counter and to apply an offset to the absolute position of the device.

19. The system of claim 16, wherein a signal generated by the up/down counter is further processed to generate a low resolution signal including three low resolution square wave signals with a 120 degree difference for use in motor commutation detection and control.

20. The system of claim 16, wherein the sensor and processing unit associated with the high resolution track, the array of Hall effect sensors associated with the reference track, and the at least one sensor associated with the third track are all mounted on a single ASIC chip.

* * * * *